3,149,138
PROCESS FOR THE PREPARATION OF SUBSTITUTED CYCLIC COMPOUNDS AND PRODUCTS RESULTING THEREFROM
Karl W. Hubel and Emile Henri Braye, Brussels, Belgium, assignors to Union Carbide Corporation, a corporation of New York
No Drawing. Filed Mar. 31, 1960, Ser. No. 18,846
Claims priority, application Great Britain Apr. 7, 1959
17 Claims. (Cl. 260—448.2)

This invention relates to the preparation of organic compounds and to products resulting therefrom. More particularly, it relates to a process for the preparation of substituted cyclic compounds such as substituted benzenic and cyclopentadienone compounds.

The present invention greatly facilitates the synthesis of substituted or unsubstituted organic compounds in that it provides a new and general one-step method for this purpose. The invention is predicated upon the discovery that when certain organo-metallic complexes, as hereinafter described, whose organic part contains a preformed carbon skeleton, are reacted with compounds containing at least one element or reactant capable of forming stable bonds with the skeleton, the bonding of the element to the skeleton is readily achieved. The compounds formed thereby are characterized as containing at least one of the carbon skeletons and at least one of the elements.

Although the mechanism of the reaction is not fully understood, basic considerations applying to the inventive process can be found in the following discussion. It is believed that organo-metallic complexes as for example, $Fe_2(CO)_6(RC_2R)_2$ or $Fe_2(CO)_7(RC_2R)_2$, can be represented by the structures respectively shown below, wherein the actual meaning of R has been disregarded for the sake of clarity.

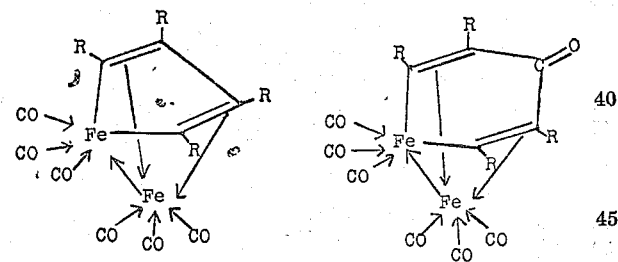

There are various evidences which indicate that the two iron atoms contained in these organo-metallic complexes have different chemical behavior. In particular it has been found that the iron atom bonded into the ring system can be more readily removed than the other iron atom. It can thus be foreseen that the splitting of the iron atoms which occurs during the reaction isolates a highly reactive carbon skeleton which can readily react with any element capable of forming stable bonding with that carbon skeleton. Similar considerations apply to the various organo-metallic complexes containing only one metal atom or one $(R'C_2R'')$ group and apply as well to the complexes having a larger number of metal atoms or $(R'C_2R'')$ groups in their structure. It is therefore apparent that by properly selecting the reactant containing an element capable of forming stable bondings with the carbon skeleton, a large variety of organic compounds can be provided.

According to this invention, a process for the preparation of substituted cyclic compounds comprises reacting an organo-metallic complex having the formula:

$$M_x(CO)_y(R'C_2R'')_z(B)_w$$

with an alkene or an alkyne. In the above referred to organo-metallic complexes, M represents a transition metal belonging to the VI, VII or VIII sub-groups of the Periodic Table, CO represents a carbonyl group, R' and/or R" may be the same or different and represent hydrogen, halogeno, carboalkoxy, alkyl, aryl, cycloaliphatic, alkoxy or silyl groups and the like, including the substituted derivatives thereof, $C_2$ represents a carbon-to-carbon bonding, B represents a member selected from the group consisting of hydrogen, mercury, halogen, alkyl, aryl, or acyl, $x$ represents an integer of from 1 to 4, $y$ represents an integer of from 1 to 10, $z$ represents an integer of from 1 to 6, and $w$ represents an integer of from 0 to 4.

Typical organo-metallic complexes suitable for use in the process of this invention include:

$Fe_2(CO)_6(RC_2R')_2$, wherein R represents a phenyl or ethyl group or a hydrogen atom and wherein R' represents a phenyl, methyl, ethyl or methoxy group or a hydrogen atom.

$Fe_2(CO)_6(RC_2R')_2(B)_2$, wherein R and R' represent hydrogen and B represents either hydrogen or a methyl rest.

These complexes may be represented by the following structure:

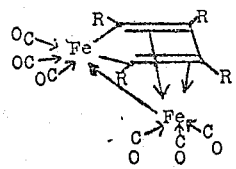

$Fe_2(CO)_7(RC_2R')_2$, wherein R and R' represent phenyl groups. This complex may be represented by the following structure:

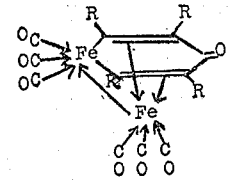

$Fe_2(CO)_6(RC_2R')$, wherein R and R' represent phenyl groups. This complex may be represented by the following structure:

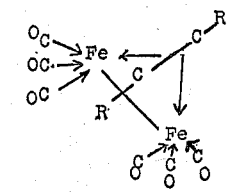

$Fe(CO)_4(RC_2R')_2$, wherein R represents a phenyl group and wherein R' represents a phenyl group or a hydrogen atom. This complex may be represented by the following structure:

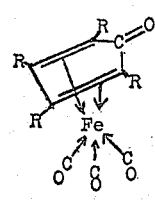

$Fe(CO)_6(RC_2R')$, wherein R represents a hydrogen atom or a phenyl group and wherein R' represents a hydrogen atom. This complex may be represented by the following structure:

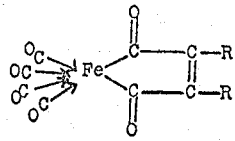

Fe$_3$(CO)$_8$(RC$_2$R')$_2$, wherein R and R' represent phenyl groups. This complex may be represented by the following structure:

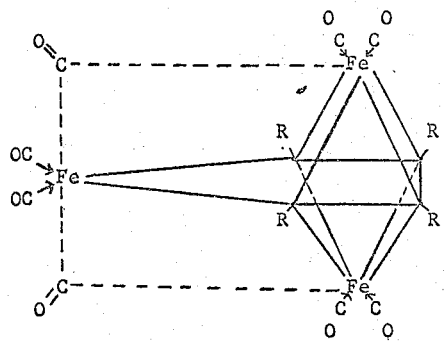

Fe$_2$(CO)$_6$(RC$_2$H)$_3$, wherein R represents a phenyl group. This complex may be represented by the following structure:

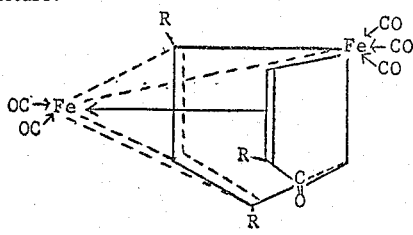

Fe(CO)$_4$(RC$_2$H)$_3$, wherein R represents a phenyl group or a hydrogen atom. This complex may be represented by the following structure:

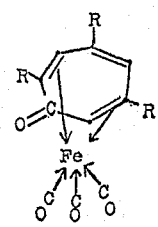

Co$_2$(CO)$_6$(RC$_2$R'), wherein R represents a phenyl group and R' represents a phenyl group or a carbomethoxy group. This complex may be represented by the following structure:

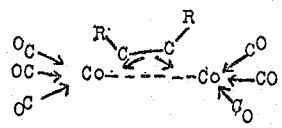

Co$_2$(CO)$_4$(RCR')$_3$, wherein R represents a carboethoxy or methyl group or a hydrogen atom and wherein R' represents a phenyl group or a trimethylsilyl group. This complex may be represented by the following structure:

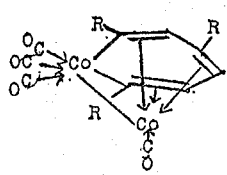

Co$_2$(CO)$_6$(RC$_2$H)$_4$Hg, wherein R represents a tertiary buty or trimethylsilyl group. This complex may be represented by the following structure:

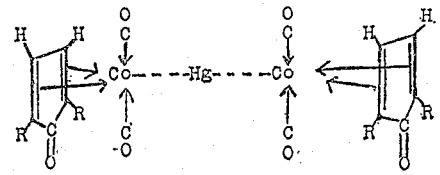

Co$_2$(CO)$_6$(RC$_2$H)$_4$, wherein R represents a tertiary butyl or trimethylsilyl group. This complex may be represented by the following structure:

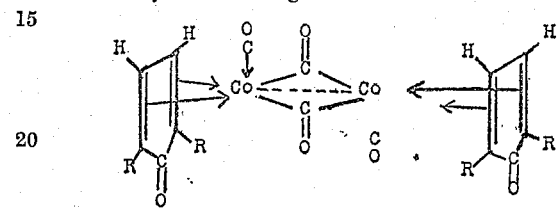

Co$_3$(CO)$_9$H(RC$_2$H), wherein R represents a phenyl group. This complex may be represented by the following structure:

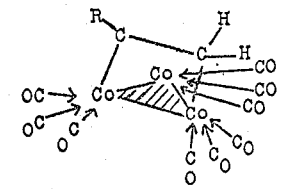

Ni(CO)$_2$(RC$_2$R')$_4$, wherein R and R' represent phenyl groups. This complex may be represented by the following structure:

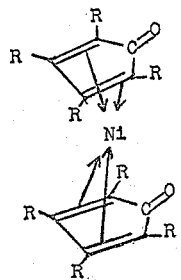

and,

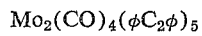

$$Mo_2(CO)_4(\phi C_2 \phi)_5$$

Other useful organo-metallic complexes are those in which the transition metal is ruthenium, rhodium, palladium, osmium, iridium, platinum, manganese, rhenium, chromium or tungsten, or are those in which the carbonyl group bonded to the metal is partially replaced by a nitrosyl, a substituted stibine, a substituted arsine, or a substituted phosphine.

The organo-metallic complexes employed as starting materials in the present invention may be conveniently prepared by the process described in copending application 707,111, entitled "Organo-Metallic Compounds and Method for Their Preparation," filed January 6, 1958, now abandoned, in the name of Karl Walter Hubel, the description thereof being incorporated herein by reference, and in its continuation-in-part, Serial No. 219,102, filed August 24, 1962.

Briefly stated, the organo-metallic complexes can be prepared by reacting an acetylenic compound with a metal carbonyl in a non-aqueous neutral medium at a temperature of between room and 300° C. As a consequence, a stable organo-metallic carbonyl reaction product is formed. The acetylenic reactant has the formula:

$$R'C \equiv CR''$$

wherein R' and R" represent a substituent selected from the group consisting of hydrogen, an organic group, and substituted derivatives thereof, a functional group and substituted derivatives thereof and an organo-substituted hydride group, the substituent being substantially inert to and inactive with the carbonyl group. The metals of the metal carbonyl group are selected from the group consisting of iron, nickel, ruthenium, rhodium, palladium, osmium, iridium, platinum, manganese, rhenium, chromium, molybdenum, cobalt and tungsten.

Any alkene or alkyne can be employed in the practice of this invention. However, exemplary of the alkyne or alkene reactant that may be employed in the process of this invention are: acetylene, diphenylacetylene, phenyl-trimethylsilylacetylene, di-(trimethylsilyl) acetylene, tertiary butyl acetylene; di-(chlorophenyl) acetylene; and di-(carbomethoxy) acetylene.

The process of this invention can be carried out using stoichiometric amounts of the starting materials. However, it has been found that an excess of the aforesaid reactant is generally preferable. The reaction is usually carried out in a polar or non-polar organic solvent such as benzene, petroleum ether, ether, tetrahydrofuran, beta-ethoxy ethanol and the like. When side reactions are to be avoided, the selected solvent should preferably be of an inert kind. However, no addition of solvent is necessary when one of the starting materials is liquid at the reaction temperature.

The reaction is usually achieved by heating the reaction mixture, or by activating the reaction mixture with ultraviolet radiations, or by combining both heating and ultraviolet radiations. However, when employing reactants normally used at relatively low temperatures, it is advisable to cool the reaction mixture down to 0° C. or lower. Generally speaking, the reaction temperature at which the process of this invention may be carried out ranges from about −60° C. to about 250° C. The specific temperatures employed will, of course, depend upon the nature of the reactants employed. It is preferable to perform the reaction in a closed system whenever one of the reactants, or the reaction products formed thereby or the solvent employed, are too volatile at the reaction temperatures.

The reaction is usually completed within a few hours, although longer reaction times may be necessary in some instances. The reaction products are easily removable from the reaction mixture after completion of the reaction using any suitable technique. The technique of removal will of course vary according to the nature of the reaction product and the occurrence of side reactions. Suitable process conditions will be further illustrated in the specific examples hereinafter described relating to the present invention. Compounds prepared by the process of this invention may be illustrated by the following general formulae representing typical five and six membered cyclic structures:

(A) 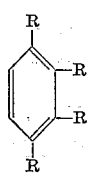

(B) 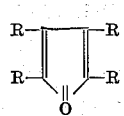

wherein R represents hydrogen or hydroxyl, halogeno, carboalkoxy, alkyl, aryl, cycloaliphatic, alkoxy or silyl groups including the substituted derivatives thereof. These benzenic and cyclopentadienonic compounds are by way of illustration only.

The products formed by the reaction of this invention include:

1,3 bis-(trimethylsilyl)-2,4,5,6-tetraphenylbenzene;
Di-t-butyl-diphenylbenzene;
1,2,3,4-tetraphenyl-5,6,bis(p-chlorophenyl)benzene;
2,5 bis-(trimethylsilyl)-3,4-diphenylcyclopentadienone;
2,3 bis-(trimethylsilyl)-4,5-diphenylcyclopentadienone.

The invention may be further illustrated by the following examples:

*Example I*

0.5 gram of $Fe(CO)_4(C_6H_5C_2H)_2$ was heated with an excess of diphenylacetylene (3 grams) at 200–230° C. for 1½ hours. Beside unreacted tolane and hexaphenylbenzene, 0.04 gram 1,2,3,4-tetraphenylbenzene (M.P. 183–193° C.) was isolated by chromatography. Hexaphenylbenzene was formed by trimerization of tolane under the influence of the complex $Fe(CO)_4(C_6H_5C_2H)_2$ which acted as a catalyst. The formation of tetraphenylbenzene was found to be due to a Diels-Alder addition reaction between tolane and 2,5-diphenyl-cyclopentadienone which represented the organic ligand of the complex.

*Example II*

4.64 grams of $Co_2(CO)_6(C_6H_5C_2C_6H_5)$ and a ten molar excess of trimethylsilyl-phenyl-acetylene was refluxed for 2 hours in 70 ml. petroleum ether (B.P. 90–100° C.). By chromatography 2.73 grams (52%) of 1,3-bis-(trimethylsilyl)-2,4,5,6-tetraphenylbenzene was isolated. It was found to have a M.P. of 274° C.

ANALYSIS

|   | Found | Theoretical, Calculated for $C_{36}H_{38}Si_2$ |
|---|---|---|
| C | 82.00 | 82.08 |
| H | 7.12 | 7.27 |
| Si | 11.5 | 10.65 |

Small amounts of 1,3,5-tris-(trimethylsilyl)-2,4,6-triphenylbenzene and several isomeric trimethylsilyltriphenyl-cyclopentadienones were also obtained.

*Example III*

0.93 grams of $Co_2(CO)_6(C_6H_5C_2C_6H_5)$ and 3.4 grams of bis-(trimethylsilyl)-acetylene (molar ratio 1:10) was refluxed in 40 ml. petroleum ether (B.P. 90–100° C.) for 2 hours. Two isomeric bis-(trimethylsilyl)-di-phenyl-cyclopentadienones was obtained. These compounds were:

(a) Yellow needles of 2,5-bis-(trimethylsilyl)-3,4-diphenyl-cyclopentadienone, M.P. 145° C.;
(b) Red leaflets of 2,3-bis-(trimethylsilyl)-4,5-diphenyl-cyclopentadienone, (0.3 gram), M.P. 145° C.;

ANALYSIS

|   | Found | Theoretical, Calculated for $C_{23}H_{28}Si_2O$ |
|---|---|---|
| C | (a) 73.52 (b) 73.34 | 73.35 |
| H | (a) 7.45 (b) 7.62 | 7.50 |

*Example IV*

0.93 gram (2 mM) $Co_2(CO)_6(C_6H_5C_2C_6H_5)$ and 1.64 grams (20 mM) t-butyl-acetylene was heated in 50 ml. petroleum ether at 90° C. for 45 minutes. By chromatography a mixture of $Co_2(CO)_4[(CH_3)_3CC_2H]_3$ and a colorless crystalline substance was isolated. This complex was washed out with methanol and the remaining product (0.3 gram) was recrystallized from acetone-methanol. The product was found to melt at 129–130°

C. Analysis and I.R. spectrum show that this compound was a diphenyl-di-tert.-butyl-benzene.

ANALYSIS

|  | Found | Theoretical, Calculated for $C_{26}H_{30}$ |
|---|---|---|
| C | 91.20 | 91.17 |
| H | 8.57 | 8.83 |

*Example V*

0.64 gram (1 ml.) $Fe_2(CO)_6(C_6H_5C_2C_6H_5)_2$ and 0.74 gram (3 ml.) p,p'-dichloro-diphenyl-acetylene was refuxed in 10 ml. mesitylene for one hour. 20 ml. petroleum ether was added and the precipitate filtered off. It was found to contain, beside 0.23 gram unreacted alkyne, 0.07 gram (4%) 1,2,3,4-tetraphenyl-5,6-bis-(p-chlorophenyl)-benzene, having a M.P. of 328° C., and 0.34 gram (49%) hexakis-(p-chlorphenyl)-benzene formed by trimerization of the alkyne during the reaction.

*Example VI*

Following the procedure of Example V, but starting with 1.24 grams (2 mM) $Fe_2(CO)_6(C_6H_5C_2C_6H_5)_2$ and 0.86 gram (6 mM) dimethyl ester of acetylene-dicarboxylic-acid in 20 ml. mesitylene, 0.11 gram 1,2,3,4-tetraphenyl-5,6-dicarbomethoxy-benzene of M.P. 265° C. was formed beside 0.3 gram hexamethylester of mellitic acid.

*Example VII*

A solution of 1 gram $Fe_2(CO)_7(C_6H_5C_2C_6H_5)_2$ and 5 ml. $CH_3OOC-C\equiv C-COOCH_3$ in 100 ml. decaline was refluxed for 10 minutes. The filtrate was chromatographed on $Al_2O_3$. 0.1 gram 1,2,3,4-tetraphenyl-5,6-dicarbomethoxy-benzene (M.P. 265° C.) was isolated beside some hexacarbomethoxy-benzene formed by trimerization of the alkyne.

*Example VIII*

5 grams of $Fe_2(CO)_8(C_2H_2)H_2$ were dissolved in 150 ml. ethanol and 10 ml. of water. This mixture was heated in an autoclave at 110° C. for 12 hours under a pressure of 20 atm. acetylene and 10 atm. $N_2$. The filtered reaction mixture was brought to dryness and the residue, after recrystallization from benzene, yielded 1.3 gram (85%) of hydroquinone.

The compounds produced by the process of this invention have art-recognized utility or will serve as intermediates in the production of compounds having a wide range of art-recognized utility.

For example, the substituted benzenic compounds of this invention are useful as polar solvents. In this regard, the silyl substituted benzenic compounds are particularly useful since these compounds have the desirable property of high thermal stability. In addition, the substituted benzenic compounds are useful in the production of insecticides, germicides and the like. The cyclic ketones are useful as intermediates for the synthesis of fulvenes. They are also useful as starting materials for the production of organo-metallic complexes and in particular π complexes. They are also useful in Diels-Alder addition reactions and in the synthesis of material products containing seven-membered ring systems. Hydroquinones are known to be useful as antioxidants and as components in photographic formulae.

What is claimed is:

1. A process for the preparation of a substituted cyclic organic compound free of carbon to metal bonds, which process comprises reacting an organo-metallic complex having the formula $M_x(CO)_y(R'C_2R'')_z(B)_w$ wherein M is a transition metal of groups VI, VII and VIII of the Periodic Table, $(R'C_2R'')_z$ represents at least one moiety bonded to M by at least one carbon to metal bond, $C_2$ represents two carbons bonded to each other, R' and R'' represent monovalent groups selected from the group consisting of hydrogen, halogeno, carboalkoxy, alkyl, aryl, cycloaliphatic hydrocarbon groups, alkoxy, silyl and trimethylsilyl, CO represents carbonyl bonded to one of the class consisting of M and $C_2$, and B is selected from the group consisting of hydrogen, mercury, halogen, alkyl, aryl and acyl, $x$ represents an integer of from 1 to 4, $y$ represents an integer of from 1 to 10, $z$ represents an integer of from 1 to 6, and $w$ represents an integer of from 0 to 4; with an acetylenic reactant whereby the carbon to metal bond between M and the moiety $(R'C_2R'')_z$ in said complex is broken and said acetylenic reactant attaches to at least a portion of the $(R'C_2R'')_z$ moiety to form a part of the ring in said substituted cycloaliphatic organic compound free of carbon to metal bonds; and recovering said substituted cyclic organic compound thus formed.

2. A process as claimed in claim 1, in which the metal of the organo-metallic complex is iron.

3. A process as claimed in claim 1, in which the metal of the organo-metallic complex is cobalt.

4. A process as claimed in claim 1, in which the metal of the organo-metallic complex is nickel.

5. A process as claimed in claim 1, in which the metal of the organo-metallic complex is molybdenum.

6. A process as claimed in claim 1, in which the reactant is acetylene.

7. A process as claimed in claim 1, in which the reactant is diphenyl acetylene.

8. A process as claimed in claim 1, in which the reactant is phenyl trimethylsilylacetylene.

9. A process as claimed in claim 1, in which the reactant is di-(trimethylsilyl)acetylene.

10. A process as claimed in claim 1, in which the reactant is tertiary butyl acetylene.

11. A process as claimed in claim 1, in which the reactant is di-(chlorophenyl)acetylene.

12. A process as claimed in claim 1, in which the reactant is di-(carbomethoxy)acetylene.

13. A process as claimed in claim 1, in which a stoichiometric excess of the reactant is employed.

14. A process as claimed in claim 12, in which an organic solvent selected from the group consisting of benzene, petroleum ether, ether, tetrahydrofuran and beta-ethoxyethanol is employed.

15. A process as claimed in claim 13, in which the reaction is carried out at a temperature of between −60° C. and 250° C.

16. A process as claimed in claim 1, in which the reaction mixture is initially activated by ultraviolet radiation.

17. 1,3 bis-(trimethylsilyl)-2,4,5,6-tetraphenylbenzene.

References Cited in the file of this patent

UNITED STATES PATENTS

| 2,849,471 | Thomas | Aug. 26, 1958 |
| 2,898,359 | Leedham et al. | Aug. 4, 1959 |
| 2,916,503 | Kozikowski | Dec. 8, 1959 |

FOREIGN PATENTS

| 229,362 | Australia | July 17, 1958 |

OTHER REFERENCES

Hubel et al.: "Berichte," volume 93, January 30, 1960, pages 103–115.

Hubel et al.: "Journal Inorg. Nucl. Chem.," volume 9, March 1959, pages 204–10.